(No Model.) 2 Sheets—Sheet 1.

J. A. CROOK.
HAY RAKE AND LOADER.

No. 508,817. Patented Nov. 14, 1893.

(No Model.) 2 Sheets—Sheet 2.

J. A. CROOK.
HAY RAKE AND LOADER.

No. 508,817. Patented Nov. 14, 1893.

Witnesses:
E. G. Lane
Chas. R. Miller

Inventor
James A. Crook
By W. K. Miller
Attorney

THE NATIONAL LITHOGRAPHING COMPANY,
WASHINGTON, D. C.

UNITED STATES PATENT OFFICE.

JAMES A. CROOK, OF AUGUSTA, ASSIGNOR OF ONE-HALF TO ARMSTRONG ASHBROOK, OF CANTON, OHIO.

HAY RAKE AND LOADER.

SPECIFICATION forming part of Letters Patent No. 508,817, dated November 14, 1893.

Application filed November 7, 1892. Serial No. 451,182. (No model.)

*To all whom it may concern:*

Be it known that I, JAMES A. CROOK, a citizen of the United States, and a resident of Augusta, county of Carroll, State of Ohio, have invented a new and useful Improvement in Hay Rakes and Loaders, of which the following is a full, clear, and exact description, reference being had to the accompanying drawings, making part of this specification.

My invention relates to improvements in hay rakes and loaders, and consists in providing a rake and loader that is adapted to be operated on either side of the wagon, that will rake the hay from either swath, or windrow, that will elevate the hay from the side and front of the wagon, and carry it over to the middle portion of the wagon.

With these ends in view, my invention relates to certain features of construction and combination of parts as will be hereinafter described and pointed out in the claims.

Figure 1:
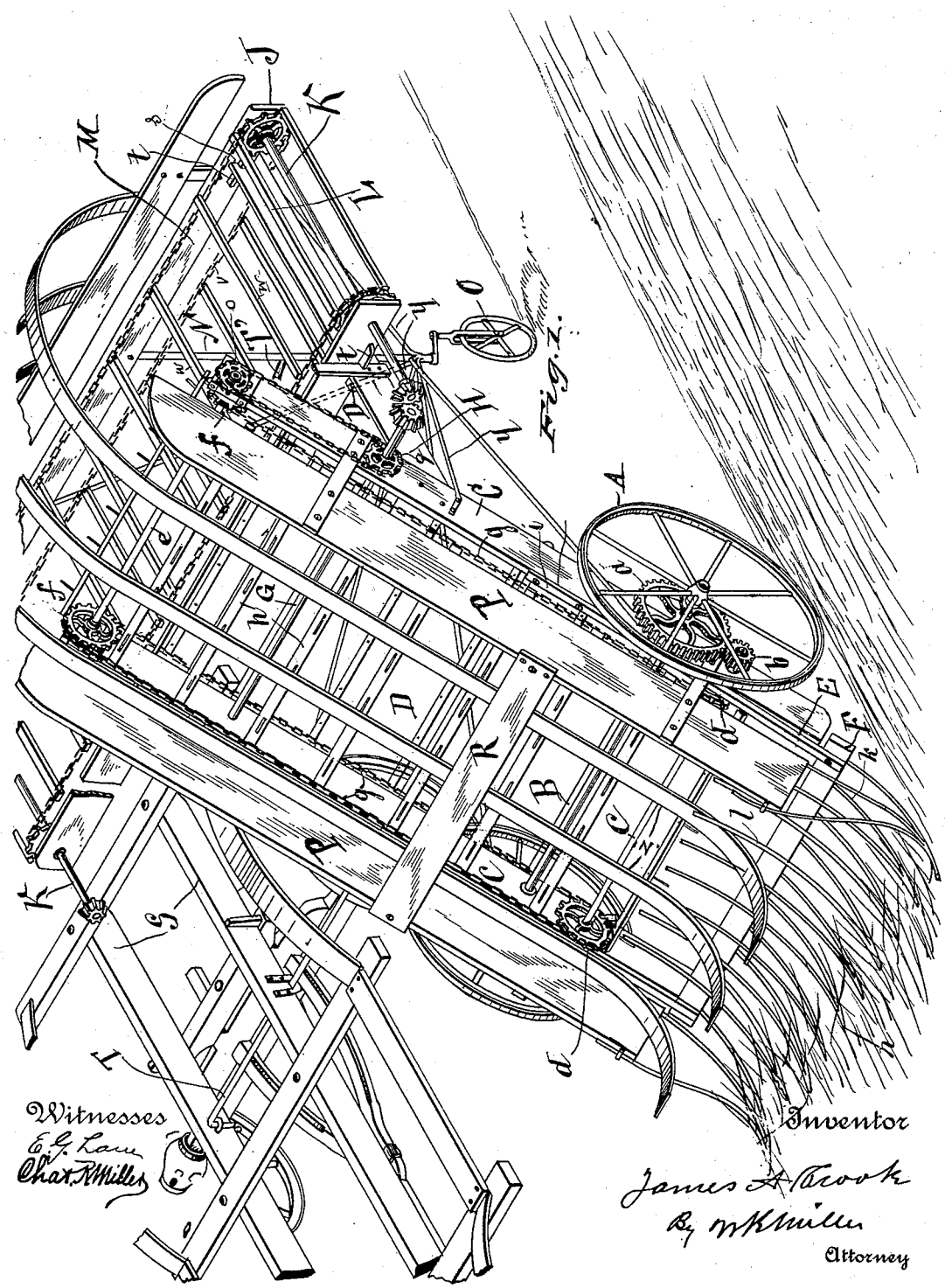
Figure 2:
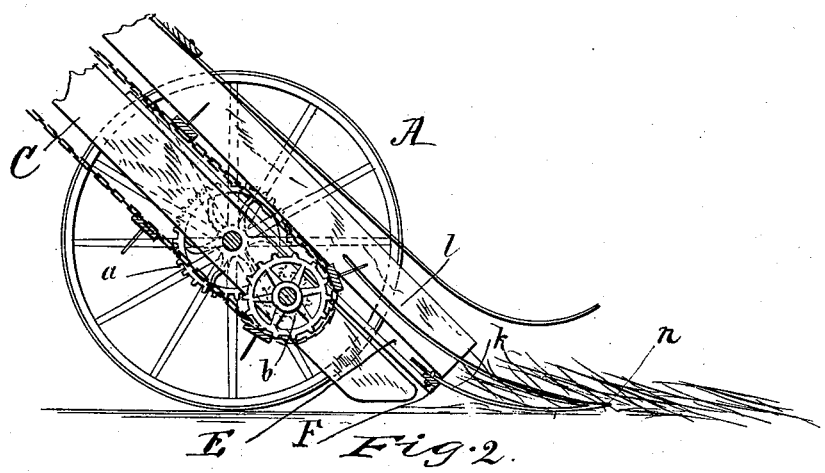
Figure 3:
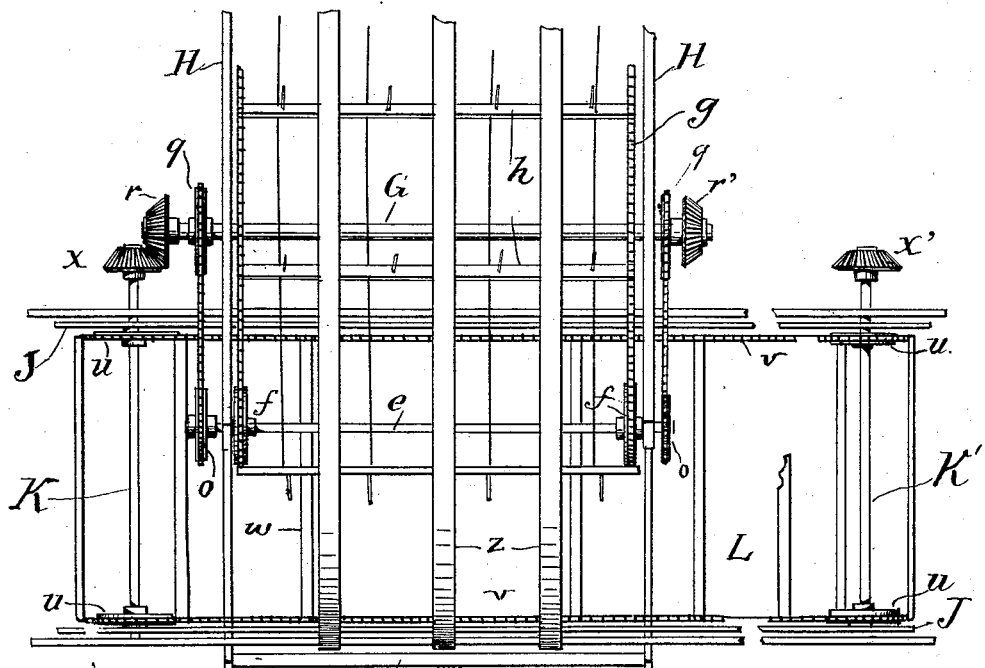

Figure 1, of the accompanying drawings is a view in perspective of a hay rake and loader illustrating my invention. Fig. 2, is a side elevation of the lower front portion, and Fig. 3, is a plan view of the upper rear portion showing the cross or transverse carrier.

Similar letters of reference indicate corresponding parts in all of the figures of the drawings.

A, represents the supporting and driving wheels, having a ratchet engagement with the shaft B, journaled in the frame C. On the axle B, is mounted a gear wheel $a$ that engages a pinion $b$ on the foot shaft $c$, on which are mounted sprocket wheels $d$. At the upper end of the frame C is provided a head shaft $e$, having mounted thereon sprocket wheels $f$. About the sprocket wheels are placed endless sprocket chains $g$ to which are secured cross slats $h$, thus forming the elevating carrier D.

At the lower end portion of the frame C are provided spring supports E, the upper ends of which are secured to the side timbers of frame C, as shown at $i$. The lower ends of the springs are secured to the rake head F, to which the teeth are secured as shown in Fig. 2. The tooth consists of a prong $k$ secured to the head F, and the long prong $l$ projecting upward and back over the lower end of the carrier D, thus providing a spring tooth having a point $n$ that is slightly raised or turned up to pass over the grass roots or above the ground, and a runner or shoe portion to rest on the ground, the teeth to spring or yield individually, as may be necessary, and the head F by the yielding of the springs E, to allow the teeth to follow the undulations of the ground. At each end the shaft $e$ is provided with a sprocket wheel $o$, which has chain engagement with similar wheels $q$, on a shaft G journaled in the frame C. This shaft G is provided at each end with a bevel pinion $r$, $r'$, adapted to engage respectively with bevel pinions $x$, $x'$, on shafts K, K' of the elevator carrier.

From the sides of the frame C, are provided rearwardly projecting arms H, that support the transverse carrier frame J, the lower edges of which rest in notches $s$ in the arms H, in which the carrier frame J may be moved, and in which it may be secured in place by the wedges $t$.

At the ends of the frame J, are provided cross shafts K, K' having mounted thereon corresponding sprocket wheels $u$ about which are placed sprocket chains $v$ having secured thereto, slats $w$, thus forming an open web or cross carrier L. On the forwardly projecting ends of the shafts K K' are mounted bevel wheels $x$, $x'$ that are adapted to engage the wheels $r$, $r'$, on the ends of shaft G, as shown in Figs 1 and 3, and hereinafter further explained.

Referring to Fig. 3, a cross bar M is shown to which is secured a support N, (see Fig. 1;) for the rear part of the machine, the lower end portion of the support having braces $y$, that extend to the side frames C, and to the rearwardly extended arms H, by which it is secured in desired position. At the lower end of the support N, is provided a caster wheel O, on which the rear portion of the machine is supported and transported, and upon which it is supported when detached from the wagon.

Side boards as P, are provided as shown in Fig. 1, connected by a cross bar R, that serves as a support for the slats $z$ that form a shield over the carrier D.

S represents the wagon to the side of which the rake and loader are secured by the distance rod T, that extends from the frame C, to the wagon frame S as shown in Fig. 1. A similar rod T' extends from the support N, to the rear portion of the wagon frame, thus securing the rake and loader to the side of the wagon on which the hay is to be loaded, and at the side of the track of the team, that the hay may be secured in a better condition than when driven over or trodden down by the team and wagon. The rods T and T' are adapted for engagement with either side of the frame C, to adapt the loader for operation on either side of the wagon.

Fig. 1 shows the rake and loader secured to, and adapted for raking and loading from the left hand side of the wagon, the carrier L projecting to the right over the central portion of the wagon, the bevel wheels $x$, on shaft K at the left hand end of carrier L, in engagement with wheel $r$, on the corresponding end of shaft G.

When the rake and loader are used on the right hand side of the wagon, the cross carrier is moved over on the arms H, to bring the pinion $x'$, in engagement with wheel $r'$ on shaft G, in which position the carrier is secured by the wedges $t$, the left hand end of the carrier extending over the wagon.

In operation referring to Fig. 1, the motion is communicated from the wheels A through the gear wheels $a$ $b$ to the carrier D, and to the carrier L by the sprocket wheels $o$ and $q$, and connecting chain, and the bevel wheels $r$ $x$. The rake and loader being secured at the left hand side of the wagon, the hay is gathered from the ground by the rake teeth, elevated by carrier D, and dropped onto the cross carrier L, by which it is carried over and deposited on the middle portion of the wagon. The advantage of having the hay carried over and deposited on the center of the wagon, whereby the labor of loading, will be greatly reduced, will be appreciated by the users of such machines, as well as the great advantage of the easy conversion of the machine from a left hand side to a right hand side loader, by simply changing the hitch of the distance rods, and the adjustment of the cross carrier L.

Having thus fully described the nature and object of my invention, what I claim, and desire to secure by Letters Patent, is—

1. The combination in a hay rake and loader of the herein described rake of the supporting frame C, of the carrier D, cross shaft G, journaled in said frame, having bevel wheels $r$ and $r'$ on the ends thereof, and a carrier L adapted to slide transverse the elevator D, having on its cross shafts K, K', bevel wheels $x$, and $x'$, to engage the wheels $r$ and $r'$ on the shaft G, whereby the carrier may be rotated to either side of the carrier D, substantially as described and for the purpose set forth.

2. The combination of the supporting frame C, the elevator D, provided with shafts G and $e$, having sprocket wheels $f$ and $o$, the rearwardly projected frame H, the transverse carrier L, adapted for lateral adjustment, having shafts K, K', with bevel pinions $x$, $x'$, and the bevel pinions $r$, $r'$, on the shaft G, substantially as described.

3. The combination in a hay loader of the supporting and driving wheels A supporting frame C elevator D, and carrier L, adapted to slide from side to side of the frame the shafts G, $e$, and K, K', sprocket wheels $f$, $o$, and chain, the bevel pinions $r$, $r'$, and $x$, $x'$, the rearwardly projected arms H, the cross bar M and supporting wheel O, substantially as described.

In testimony whereof I have hereunto set my hand this 17th day of October, A. D. 1892.

JAMES A. CROOK.

Witnesses:
W. K. MILLER,
CHAS. R. MILLER.